(12) United States Patent  (10) Patent No.: US 7,981,174 B2
Bailey et al.  (45) Date of Patent: Jul. 19, 2011

(54) ELECTRICALLY REGENERATED EXHAUST PARTICULATE FILTER FOR AN ENGINE SYSTEM AND OPERATING STRATEGY THEREFOR

(75) Inventors: Brett Bailey, Peoria, IL (US); Michael J. Pollard, Peoria, IL (US); Michael Readey, Peoria, IL (US); Craig F. Habeger, Chillicothe, IL (US); Robert L. Meyer, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 458 days.

(21) Appl. No.: 11/986,716

(22) Filed: Nov. 26, 2007

(65) Prior Publication Data

US 2009/0133382 A1  May 28, 2009

(51) Int. Cl.
*B01D 39/00* (2006.01)
*B01D 39/02* (2006.01)

(52) U.S. Cl. ............. 55/282.3; 55/512; 55/513; 55/514

(58) Field of Classification Search ............ 55/282, 55/312–314, 282.3
See application file for complete search history.

(56) References Cited

U.S. PATENT DOCUMENTS

| 4,329,162 | A |   | 5/1982  | Pitcher, Jr. |
| 4,464,185 | A |   | 8/1984  | Tomita et al. |
| 4,478,618 | A |   | 10/1984 | Bly et al. |
| 4,573,317 | A | * | 3/1986  | Ludecke ................ 60/303 |
| 4,576,799 | A |   | 3/1986  | Worner et al. |
| 4,651,524 | A | * | 3/1987  | Brighton ................ 60/274 |
| 4,652,286 | A |   | 3/1987  | Kusuda et al. |
| 4,829,766 | A | * | 5/1989  | Henkel ................... 60/303 |
| 5,002,666 | A | * | 3/1991  | Matsumoto et al. ..... 210/321.61 |
| 5,009,857 | A |   | 4/1991  | Haerle |
| 5,042,249 | A |   | 8/1991  | Erdmannsdoerfer |
| 5,138,836 | A | * | 8/1992  | Pfister ................... 60/311 |
| 5,174,969 | A |   | 12/1992 | Fischer et al. |
| 5,194,078 | A |   | 3/1993  | Yonemura |
| 5,224,973 | A |   | 7/1993  | Hoppenstedt et al. |
| 5,248,481 | A |   | 9/1993  | Bloom et al. |
| 5,248,482 | A |   | 9/1993  | Bloom |
| 5,258,164 | A | * | 11/1993 | Bloom et al. ............. 422/174 |
| 5,293,742 | A | * | 3/1994  | Gillingham et al. ........ 60/288 |
| 5,298,046 | A |   | 3/1994  | Peisert |
| 5,300,133 | A |   | 4/1994  | Schuster et al. |
| 5,388,400 | A | * | 2/1995  | Hoppenstedt et al. ....... 60/274 |
| 5,458,673 | A |   | 10/1995 | Kojima et al. |
| 5,578,277 | A | * | 11/1996 | White et al. ............. 422/180 |
| 5,595,580 | A |   | 1/1997  | Kawamura |
| 5,656,048 | A | * | 8/1997  | Smith et al. ............. 55/282 |
| 5,820,833 | A | * | 10/1998 | Kawamura ............... 422/174 |
| 5,961,931 | A |   | 10/1999 | Ban et al. |
| 6,107,603 | A |   | 8/2000  | Dementhon et al. |
| 6,176,896 | B1 |  | 1/2001  | Dementhon et al. |
| 6,572,682 | B2 |  | 6/2003  | Peter et al. |
| 6,634,210 | B1 |  | 10/2003 | Bosch et al. |
| 6,773,479 | B2 |  | 8/2004  | Debenedetti et al. |

(Continued)

*Primary Examiner* — Walter D Griffin
*Assistant Examiner* — Amber Orlando
(74) *Attorney, Agent, or Firm* — Liell & McNeil

(57) ABSTRACT

An exhaust particulate filter for an engine system includes an array of filter cartridges positioned within a shell, each of the cartridges having an electrically powered heating element coupled therewith. Exhaust gases are distributed among the cartridges according to a single distribution pattern, and the filter can be regenerated without diverting, dividing or bypassing exhaust gases from the filter. Other aspects include feedback control and feedforward control of regeneration based on sensing an electrical resistance property of each of the electrically powered heating elements.

17 Claims, 6 Drawing Sheets

U.S. PATENT DOCUMENTS

| | | |
|---|---|---|
| 7,029,510 B2 | 4/2006 | Frankle et al. |
| 7,044,992 B2 | 5/2006 | Frankle et al. |
| 7,108,739 B2 | 9/2006 | Iyer et al. |
| 7,128,961 B2 | 10/2006 | Kai et al. |
| 2003/0079869 A1 | 5/2003 | Brunner et al. |
| 2005/0217835 A1 | 10/2005 | Amstutz et al. |
| 2006/0070364 A1* | 4/2006 | Reamsnyder et al. .......... 55/484 |
| 2006/0239880 A1 | 10/2006 | Fukuda et al. |

* cited by examiner

ELECTRICALLY REGENERATED EXHAUST PARTICULATE FILTER FOR AN ENGINE SYSTEM AND OPERATING STRATEGY THEREFOR

TECHNICAL FIELD

The present disclosure relates generally to electrically regenerated exhaust particulate filters used in engine systems, and relates more particularly to selectively energizing electrically powered heating elements within filter cartridges of the exhaust particulate filter without changing exhaust gas distribution therein.

BACKGROUND

Operation of internal combustion engines, particularly diesel engines, usually results in the generation of particulate matter (PM) including inorganic species (ash), sulfates, small organic species generally referred to as soluble organic fraction (SOF), and hydrocarbon particulates or "soot." Various strategies have been used over the years for preventing release of PM into the environment. For some time, on-highway machines have been equipped with exhaust particulate traps as standard equipment. More recently, off-highway machines have been the subject of attention with regard to reducing/controlling PM emissions. While various designs for on-highway exhaust particulate filters have proven to be relatively effective in their intended environment, there are certain shortcomings to the designs if subjected to the demands placed on many off-highway machines. Moreover, even the most successful of the many known on-highway systems suffer from various drawbacks.

Conventional exhaust particulate filters are available in a wide variety of designs. Commonly, a fibrous material or porous ceramic material is positioned in the path of exhaust exiting an engine, and collects particulates to prevent their escape via the engine exhaust stream. The accumulation of PM within a filter tends to increase the resistance of the filter apparatus to the flow of exhaust gas, necessitating some means of cleaning the filter material, as reduced flow can affect fuel consumption, altitude capability, engine response and exhaust inlet and outlet temperatures. While filters may be mechanically cleaned, they tend to clog frequently enough that manual or mechanized cleaning is impractical.

Common approaches for removing accumulated PM from exhaust filters have been to regenerate the filter with heat or with heat and catalysts. Since typical engine exhaust temperatures are only intermittently, if ever, high enough to initiate combustion of accumulated PM, some means for periodically generating extra heat energy and/or the provision of combustion-facilitating catalyst materials has typically been used. Intake throttling and exhaust throttling are also used to increase the temperature of exhaust gas to a temperature sufficient to initiate combustion of the accumulated PM. In any case, once combustion of the accumulated PM is induced, it can be consumed rather than passed out to the environment, and returning the filter to a desired state. These approaches, however, have their own disadvantages.

On the one hand, catalyst materials tend to be relatively expensive, having obvious disadvantages where a manufacturer seeks to commercialize a particular filter design. On the other hand, applying additional heat energy, with or without catalysts, typically requires some type of auxiliary burner or other relatively complicated subsystem. Many filter regeneration strategies have also suffered from the inability to reliably initiate or maintain acceptable combustion of the accumulated PM without temporarily blocking or reducing exhaust flow through the portion of the filter to be regenerated. In some instances, for example where the filter design relies upon propagation of a flame against the flow of exhaust gases, the exhaust gases can apparently blow out the flame. In other instances, where a flame is propagated with the flow of exhaust gases rather than unsustainable combustion the PM can burn out of control, raising the temperature of the filter and related components above temperatures they are designed to withstand.

Engineers have relied in many instances on relatively complicated valving or bypass systems to control exhaust throughput to a portion of the filter being regenerated. This is done in an attempt to achieve self-sustaining combustion of accumulated PM without combustion getting out of control. The moving parts in such systems not only add complexity, weight and expense to the associated machine, they also can fail, particularly when subjected to the rigors of off-highway work.

A still further problem associated with conventional regeneration strategies is the excessive energy consumed in the regeneration process. In the case of auxiliary burner strategies, extra fuel is typically injected into and combusted in the exhaust gas stream to raise the temperature of the exhaust gases to a regeneration temperature. Various electrically regenerated systems have been proposed, however, they too tend to require an excess of energy to regenerate. Conventional alternators and batteries commonly used with diesel engine-powered machines are not typically sufficiently powerful to regenerate an exhaust particulate filter, and supplementary electrical power such as a connection to a power grid or an oversized alternator is commonly required.

U.S. Pat. No. 5,293,742 to Gillingham et al. ("Gillingham") is directed to a trap apparatus having tubular filter elements, for use in particular with diesel engines. In the design set forth in Gillingham, filter tubes surrounded with filter material such as yarn or various foams are used. The filter tubes are positioned within a housing, subdivided into different sectors. During regeneration, parts of the housing can be closed off and the filter tubes therein heated via electric heaters to effect regeneration. While the design of Gillingham may serve its intended purpose, it suffers from a variety of drawbacks. On the one hand, an elaborate system is necessary to direct exhaust gases to only certain parts of the filter apparatus, while restricting flow of exhaust gases to certain parts for regeneration. Restricting flow inherently reduces the efficacy of the filter and possibly the overall exhaust system, as regeneration is often necessary relatively frequently, often numerous times a day depending upon operating conditions. As is the case with many electrically regenerable filters, discussed above, Gillingham may also need a relatively large amount of electrical energy to successfully regenerate.

SUMMARY

In one aspect, an exhaust particulate filter system includes a shell having an exhaust gas inlet, an exhaust gas outlet and an array of filter cartridges positioned within the shell which are configured to filter exhaust gases passing between the exhaust gas inlet and the exhaust gas outlet. Each of the filter cartridges includes a tube having perforations therein, a fibrous metallic filter medium and at least one inlet fluidly connected with the exhaust gas inlet. The filter system further includes a distribution element for exhaust gases disposed within the shell between the exhaust gas inlet and the exhaust gas outlet, the distribution element having a fixed configuration and being adapted to direct exhaust gases toward inlets of each of the filter cartridges of the array according to a single exhaust gas distribution pattern of the exhaust particulate filter system. The filter system still further includes a filter regeneration system configured to selectively regenerate less than all of the filter cartridges at a time, the filter regeneration system being configured to connect with an electrical power source and including electrically powered heating elements coupled one with each of the filter cartridges.

In another aspect, a method of operating an exhaust particulate filter system of an internal combustion engine includes a step of filtering particulates from exhaust gases with an array of filter cartridges of an exhaust particulate filter, including passing the gases from an inlet of the exhaust particulate filter to inlets of the filter cartridges via an exhaust gas distribution pattern. The method further includes a step of, without changing the exhaust gas distribution pattern, energizing less than all of a plurality of electrically powered heating elements coupled one with each of the filter cartridges.

In another aspect, a filter cartridge for an exhaust particulate filter includes a tube having a first end and a second end and perforations therein which define a filtering length of the filter cartridge. The tube has at least one exhaust gas inlet, at least one exhaust outlet and a length extending between the first and second ends, the tube further includes a width which is at least an order of magnitude less than the length. The filter cartridge further includes a fibrous metallic filter medium configured to filter particulates from exhaust gases passing through the tube, and a first mounting element coupled with the first end of the tube and including a fastening element for immovably coupling the first end of the tube with a frame of the exhaust particulate filter. The filter cartridge still further includes a second mounting element coupled with the second end of the tube and including a support element for movably coupling the second end of the tube with the frame of the exhaust particulate filter, and an electrical circuit segment for initiating regeneration of the cartridge, the electrical circuit segment including an electrically powered heating element and electrical connectors configured to connect with an electrical power source for selectively energizing said electrically powered heating element, and wherein said electrically powered heating element contacts said fibrous metallic filter medium

DETAILED DESCRIPTION

Figure 1:
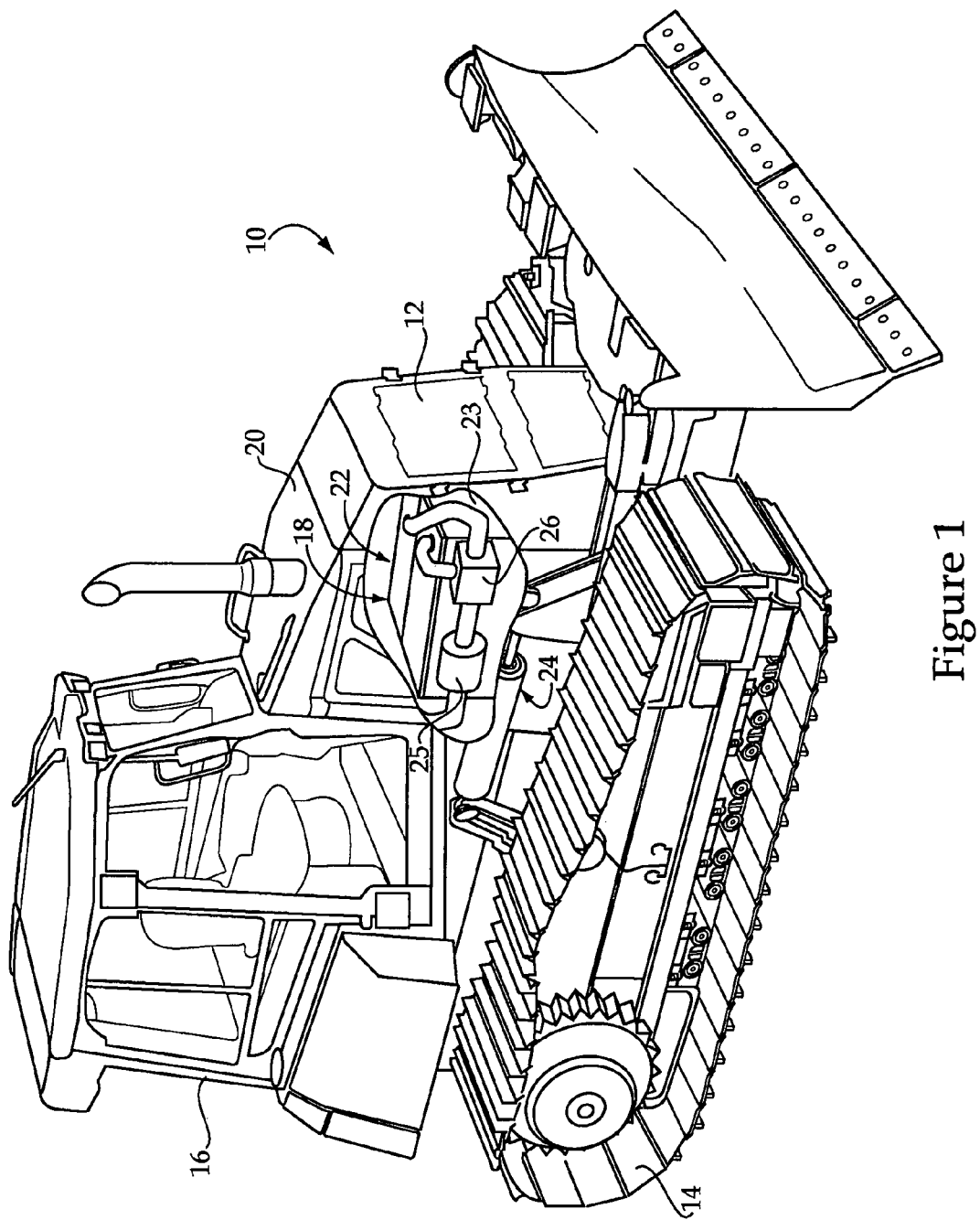
FIG. 1 is a perspective view of an off-highway machine, having an exhaust particulate filter system, according to one embodiment.

Referring to FIG. 1, there is shown a machine 10 according to one embodiment. Machine 10 is shown in the context of an off-highway track-type tractor having a frame 12, ground engaging tracks 14 mounted to frame 12 and an operator cab 16 also mounted to frame 12. Machine 10 may further include an engine system 22 having an engine 23 such as a compression ignition diesel engine, coupled with an exhaust particulate filter system 24 which includes an exhaust particulate filter 25. In one embodiment, filter 25 may have a shape such that filter 25 fits within a predefined spatial envelope, within an engine compartment 18 of machine 10. This space available for mounting filter 25 may be dictated by a variety of factors, including size and shape of various components of engine system 22 such as a turbocharger 26 coupled with an exhaust pipe 28, a hood 20, frame 12 and various other parts of machine 10 depending upon its particular design. Other concerns may also dictate the location, size and shape of the predefined spatial envelope for filter 25. For example, it may be desirable in some instances to locate filter 25 outside of engine compartment 18 for purposes such as thermal management of engine 23, or simply for matters of convenience. In addition to shape, location and mounting flexibility available with filter system 24, it may be regenerated by way of a unique strategy, providing further advantages over state of the art exhaust particulate filter systems. Whereas temperature concerns in many known strategies require positioning a filter in close proximity to its associated engine, or extensive thermal insulation, filter system 24 can be located essentially anywhere on machine 10. The foregoing and other features make filter system 24 amenable to fitting into relatively restrictive preexisting spatial envelopes, including retrofitting existing machines, as well as providing a spectrum of shape, mounting and location options to designers developing altogether new machine configurations.

While off-highway machines such as trucks, tractors, loaders, graders, scrapers, etc. may benefit from the use of exhaust particulate filter systems as described herein, the present disclosure is not limited in this regard. Machine 10 might be an on-highway machine, or even a stationary machine such as a generator or genset. Further still, while machines having spatial constraints for filter mounting are mentioned herein, the present disclosure is also not limited in this regard.

Figure 2:
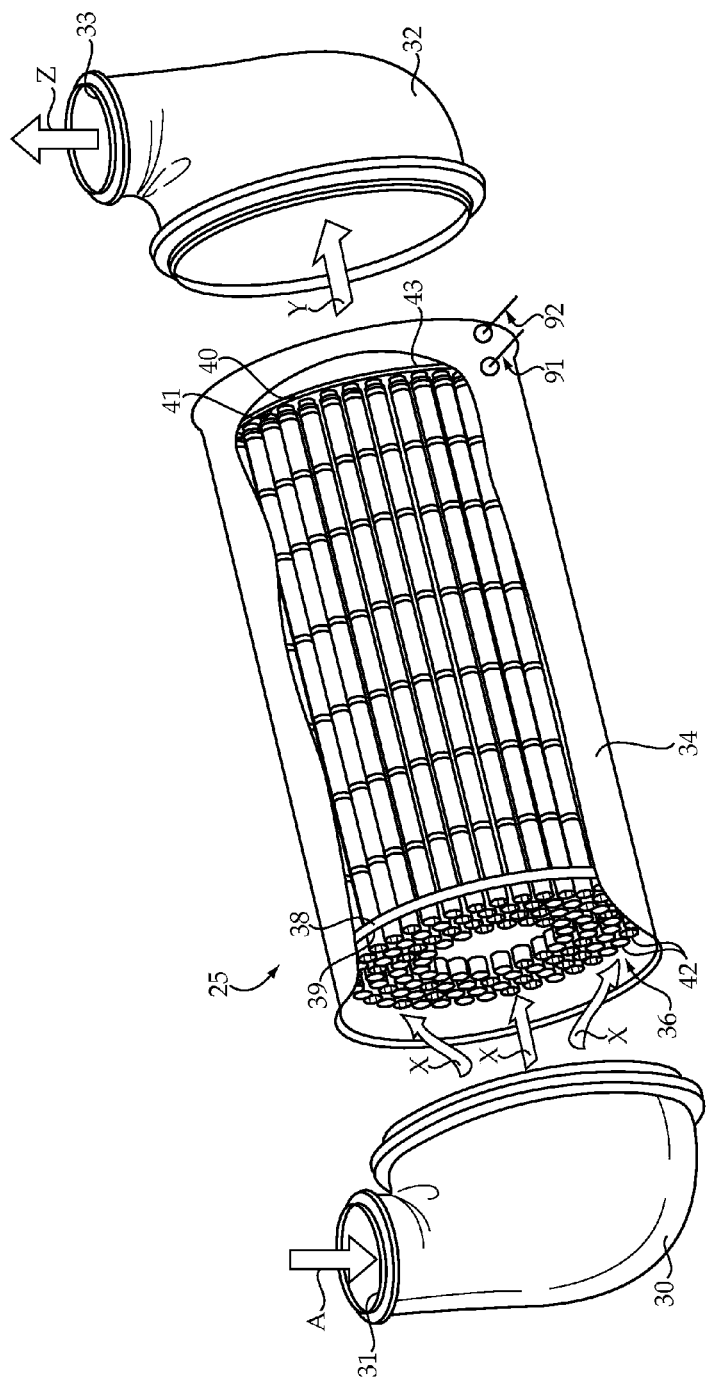
FIG. 2 is a partially open perspective view of a partially disassembled exhaust particulate filter, according to one embodiment.

Referring also to FIG. 2, there is shown a partially disassembled exhaust particulate filter 25, similar to that shown in FIG. 1. Filter 25 may include an inlet portion 30 having an exhaust gas inlet 31, an outlet portion 32 having an exhaust gas outlet 33 and a shell 34. Other fluid connections to filter 25 may exist for various purposes, such as exhaust gas recirculation, exhaust gas cooling and connecting with one or more turbochargers. Inlet portion 30, outlet portion 32 and shell 34 may together comprise a filter housing having a shape. In certain embodiments, the shapes of one or more of the respective housing components 30, 32 and 34 may be tailored to fit filter 25 within the aforementioned predefined spatial envelope. For example, filter 25 may have a generally circular axial cross-section such as that shown in FIG. 2, a generally oblong axial cross-section, a rectangular axial cross section, or some other shape. "Axial" cross-section should be understood as referring to a cross-section perpendicular a longitudinal central axis of shell 34 (not shown), extending between components 30 and 32.

Shape flexibility of filter 25, as well as other advantages, arise in part from the manner in which certain components of filter 25 are designed. Filter 25 may include a plurality of identical filter cartridges 42, for example, fifty or more cartridges, or even one hundred or more cartridges in some embodiments, which are positioned in an array 36. An example embodiment, such as a stationary power generation system might utilize a thousand or more cartridges. The use of numerous identical filter cartridges allows the general shape of filter 25 to be quite flexible as compared to many earlier filter designs, without sacrificing efficacy. It should be appreciated that certain embodiments might include differing shapes, sizes or lengths of cartridges, thus the present description should not be construed to suggest that ever single cartridge be identical. Since each individual filter cartridge 42 comprises a relatively small proportion of array 36, changes to the overall shape of array 36 may be driven more by the machine application than the shape of the individual cartridges 42. This differs from many earlier systems wherein a relatively small number of filter elements are arranged in a pattern dictated or limited by the overall filter design or manner of construction rather than by a spatial envelope into which the filter is to be fit. Each of filter cartridges 42 in array 36 may filter exhaust gases passing from exhaust gas inlet 31 to exhaust gas outlet 33. Arrows illustrate an approximate exhaust gas flow path through filter 25, including a first segment A, a second segment X, a third segment Y and a fourth segment Z. Thus, exhaust gases may enter inlet 31 via segment A, and may then enter shell 34 via segment X, exit shell 34 via segment Y and exit outlet portion 32 via segment Z. Within shell 34, exhaust gases pass through cartridges 42 of array 36 whereby particulates are removed, as described herein.

Cartridges 42 may be supported in a first support frame or plate 38 and a second support frame or plate 40. Holes 39 and 41 in plates 38 and 40, respectively, may receive ends of cartridges 42 and may be arranged in a pattern corresponding to an arrangement and distribution of filter cartridges 42 in array 36. Where a non-cylindrical filter is used, the pattern of holes 39 and 41 may be varied to correspond to the overall shape of the filter. Each of support plates 38 and 40 may include an outer perimeter or edge 37 and 43, respectively, which is matched to a shape of shell 34. Support plates 38 and 40 may have circular shapes similar to that shown in FIG. 2, or they might have a wide variety of other shapes such as triangular, circular, square, trapezoidal or even irregular and non-polygonal shapes. Array 36 may have an essentially limitless variety of configurations corresponding to a shaped of shell 34, and in turn support plates 38 and 40, imparting shape flexibility to filter 25 limited generally only to manufacturing capabilities and/or practicalities for the various components.

In one embodiment, first support plate 38 comprises a distribution element for exhaust gases which is adapted to direct exhaust gases toward inlets of each of cartridges 42 according to a single exhaust gas distribution pattern of filter 25. As used herein, "single exhaust gas distribution pattern" means that flow dividers, restrictions, valves, diverters, bypass lines, or other means for changing the distribution of exhaust gases to inlets of cartridges 42 are not used in filter 25. Thus, plate 38, or such other exhaust gas distribution elements as may be used with filter 25, has a fixed configuration, and the distribution of exhaust gases is not adjustable in filter 25. On this and other bases, filter 25 differs from exhaust particulate filters, such as Gillingham et al., described above, which vary distribution of exhaust gases among elements of the filter for various purposes. This feature of filters and operating strategies according to the present disclosure has many advantages, including reduced cost, complexity and improved reliability, as a filter having few or no moving parts is made possible.

Moreover, since no portion of filter 25 is blocked from exhaust flow, even for regeneration, the size of filter 25 and total number of its cartridges may be tailored more closely to expected filtering needs rather than oversized to compensate for a portion of the cartridges which are blocked off for regeneration. Various particulate filters are known which utilize diffusers to reduce exhaust gas flow velocity to a level appropriate for desired filter efficacy and to facilitate uniform loading of the filter during operation. Filters contemplated herein might include an inlet and/or an outlet diffuser, and in some instances may include relatively simpler inlet and/or outlet diffusers than are known from earlier filters, as filter 25 is considered to be relatively less sensitive to unevenness in flow for reasons which will be apparent from the following description. Also shown in FIG. 2 are electrical connectors 91 and 92 mounted to shell 34 which are part of a regeneration system for filter 25 described herein, and are configured to connect with an electrical power source of machine 10. It is contemplated that the electrical power source used in regenerating filter 25 may be a conventional on-board power source, such as an alternator, a battery, or a generator. Alternatives are contemplated, however, as further described herein. The power draw from an electrical power source required in regenerating filter 25 may be substantially less than in other electrically regenerated filters, enabling the use of conventional-sized alternators, batteries, etc.

Figure 3:
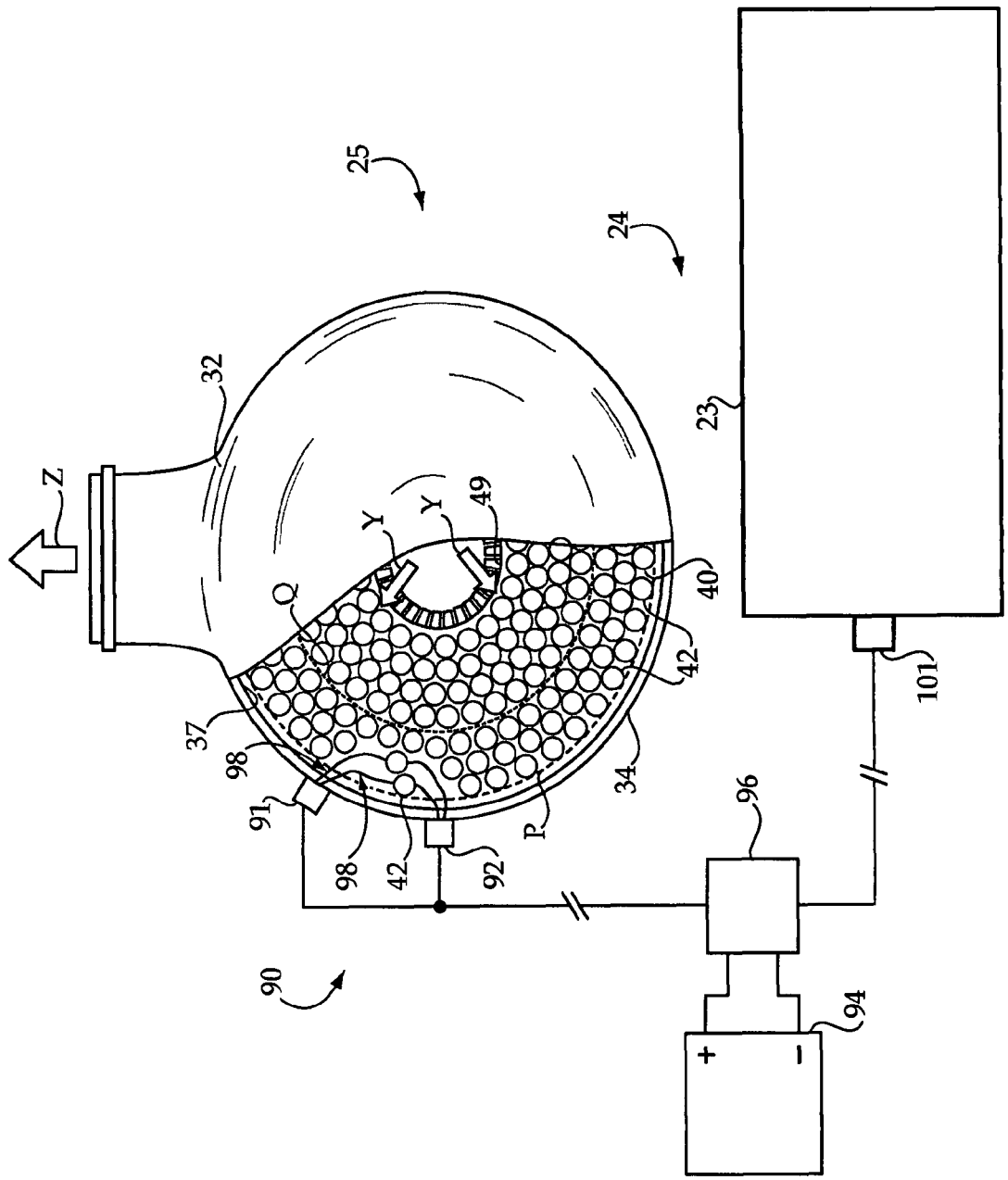
FIG. 3 is a partially open diagrammatic end view of an exhaust particulate filter system, according to one embodiment.

Referring to FIG. 3, there is shown an end view of filter 25, partially open to illustrate filter cartridges 42 supported in plate 40. Plate 40 includes an outlet 49 through which exhaust gases may pass, after being filtered via cartridges 42. In one embodiment, filter cartridges 42 may be packed within shell 34 according to a packing arrangement, such as a hexagonal packing arrangement, and each individual cartridge 42 separated from adjacent cartridges by an average distance less than a width of one of cartridges 42. Shell 34 may further include an inner perimeter 37 which is spaced from a perimetric line P which is tangent to peripherally located ones of filter cartridges 42. Packing filter cartridges 42 into shell 34 can avoid wasted space and thus reduce filter size, as a relatively great number of filter cartridges 42 can be packed into a given volume defined by shell 34. The relatively small diameter of each of filter cartridges 42 allows a relatively larger number to be used in filter 25 than what would be possible with fewer cartridges. Also shown in FIG. 3 is a regeneration system 90 coupled with filter 25 and with engine 23. Regeneration system 90 may be configured to connect with or may itself include an electrical power source 94. In one embodiment, electrical power source 94 comprises a battery, whereas in other embodiments electrical power source 94 might be an alternator coupled with engine 23, a stand-alone generator, an electrical grid, etc.

Electrical power source 94 might also comprise thermoelectric generators coupled with one or more of cartridges 42 or positioned elsewhere within filter 25. Certain commercially available thermoelectric generators are capable of operating in two modes, the first of which generates heat when electrical power is supplied thereto, and the second of which generates electrical power when heat is supplied. In one embodiment, thermoelectric generators associated with one or more of cartridges 42 could be operating in the first mode, and others operating in the second mode. Those thermoelectric generators which are operating in the second mode could generate electrical power used by the thermoelectric generators operating in the first mode, generating heat to initiate regeneration of an associated filter cartridge.

Whatever the electrical power source used, regeneration system 90 may be operable to regenerate one or more of cartridges 42, and may include an electronic control unit 96 which is configured to select one or more, but typically less than all, of cartridges 42 for regeneration at any given time. Electronic control unit 96, which may be an engine controller for engine 23 or a separate controller, may be configured via executing computer readable code to selectively regenerate one or more of cartridges 42 on an as-needed basis or at predetermined intervals or in a predetermined pattern, further described herein. In one embodiment, electronic control unit 96 may comprise a control device coupled with electrical power source 94 and configured to selectively supply electrical power to electrically powered heating elements, for example resistive heating elements such as resistive wires, or other electrically powered heating elements such as thermoelectric generators, associated one with each of cartridges 42. Electrical circuits 98 may connect between connectors 91 and 92, each being selectively energized via electronic control unit 96 as described herein and having the electrically powered heating element associated with the corresponding cartridge 42 located therein. It should be appreciated that in certain embodiments some of cartridges 42, or such other cartridges as might be used in the present context, may be passively regenerated.

Electronic control unit 96 may also comprise a monitoring device configured to monitor an electrical resistance property in each of electrical circuits 98 and generate a signal corresponding to the monitored electrical resistance property, as further described herein. Regeneration of selected ones of cartridges 42 may be initiated in a manner responsive to the signal associated with the monitored electrical resistance property of the corresponding circuit. A variety of types of wiring harnesses and the like might be used to couple connectors 91 and 92 with circuits 98. Other strategies, such as a single circuit board having connectors corresponding to each of electrical circuits 98, and arranged in a predetermined pattern such that circuits 98 may be readily connected therewith upon assembling filter 25, might also be used. Filter system 24 may further include a sensor 101 such as a speed or load sensor coupled with engine 23 and outputting a signal indicative of an exhaust mass flow from engine 23. In certain embodiments, described hereinbelow, electronic control unit 96 may initiate regeneration of selected ones of cartridges 42 in a manner which is responsive to signals from sensor 101.

Figure 4:
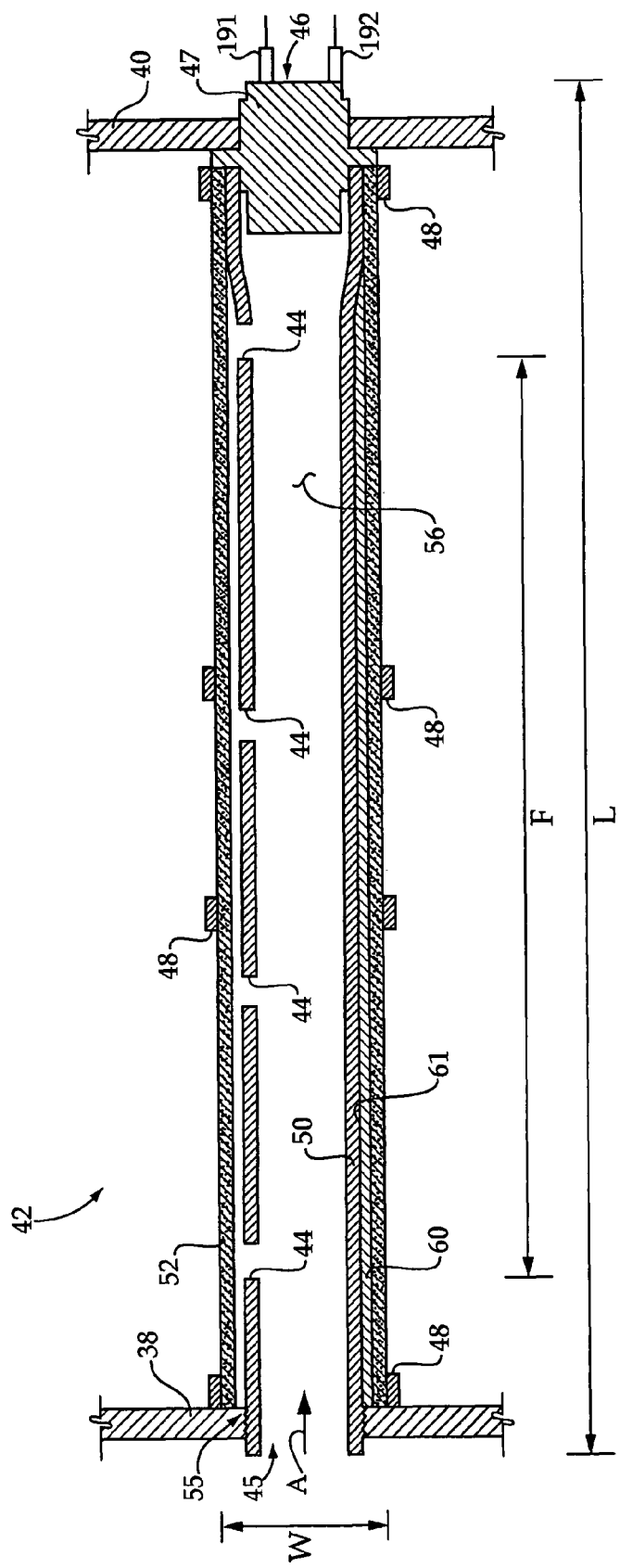
FIG. 4 is a sectioned side view of a filter cartridge for an exhaust particulate filter, according to one embodiment.

Turning now to FIG. 4, there is shown a sectioned side view of a cartridge 42 according to one embodiment. Cartridge 42 includes a tube 50 having a plurality of perforations 44 therein which provide fluid communications between an interior 56 of tube 50 and an exterior thereof, which will typically be an interior of filter 25. Although using hollow cylinders for each of tubes 50 may be one practical implementation strategy, the term "tube" should not be understood as limited to cylindrical shapes, and square, triangular or another shape might be used without departing from the scope of the present disclosure. Tube 50 is wrapped with one or more layers of a fibrous metallic filter medium 52. In one embodiment, filter medium 52 consists of a sintered mat of metal fibers. Other filter media are contemplated herein, however, such as metallic yarns or wools, etc., which may be placed within interior 56 or wrapped about tube 50. Tube 50 includes a first end 45, comprising an open end, and a second, opposite end 46 which comprises a closed end. Exhaust gases may pass into end 45, illustrated via arrow A, into interior 56, and then out through filter medium 52 via perforations 44. Particulate matter in the stream of exhaust gases is thus filtered via filter medium 52. While the illustrated flow pattern, i.e. out of interior 56 via perforations 44, is one practical implementation strategy, the present disclosure is not thereby limited and exhaust gases could be passed into interior 56 via perforations 44, then out of cartridge 42 via first end 45. In the case of either strategy, filter medium 52 might be placed either inside tube 50 or outside of tube 50. A plurality of clamps 48 may be provided and positioned about tube 50 to clamp filter medium 52 in place. In one embodiment, clamps 48 may be secured about tube 50 and filter medium 52 by a technique known in the art as swagging, more fully described in commonly owned and U.S. patent application Ser. No. 11/728,905, now U.S. Patent No. 2008/0236118

Tube 50 may further include a mounting element 55 proximate first end 45 which comprises a fastening element 55 configured to immovably mount tube 50 to plate 38. As used herein, the term "immovably" should be understood to mean that tube 50 occupies a fixed location relative to plate 38 when assembled therewith. Mounting element 55 might comprise threads such that tube 50 is screwed into plate 38, element 55 might also comprise a radially expanded portion of tube 50, such as may be achieved via swagging. Still other coupling strategies might be used to immovably couple end 45 to plate 38 or another support structure, such as various clamping arrangements, welding or brazing, etc. In contrast, end 46 may be movably coupled with plate 40. A stepped or tapered plug 47 or other support element may comprise a mounting element positioned at end 46 which is loose fitted into plate 40.

In one embodiment, tube 50 and possibly support plates 38 and 40 may be formed from 439 stainless steel, whereas filter media 52 may include an iron, chromium and aluminum alloy. All or substantially all of the components of filters according to the present disclosure may consist of one form or another of ferritic stainless steel in certain embodiments. By loose-fitting plug 47 in support plate 40, a feature which may be common to all of the filter designs contemplated herein, cartridge 42 may move relative to support plate 40 due to expansion and contraction resulting from thermal cycling.

Returning to FIG. 3, as mentioned above cartridges 42 may have a hexagonal packing arrangement, generally permitting a maximum number of filter cartridges to be located within a given volume based on the available spatial envelope in or on machine 10, for example. Where a hexagonal packing arrangement is used, a majority of internally located filter cartridges 42 in array 36 will typically be surrounded by at least five other filter cartridges, whereas a majority of peripherally located filter cartridges 42 will typically be surrounded by fewer than five other filter cartridges. Internally located filter cartridges 42 will generally be greater in number than peripherally located filter cartridges 42. In accordance with the packing arrangement, cartridges 42 may be positioned at an average distance from one another that is less than an average diameter of cartridges 42. This average distance may also be an equal distance between all of the respective filter cartridges. In certain embodiments, cartridges 42 may be positioned at an average distance from one another that is less than one half an average diameter of cartridges 42. It may be desirable to pack cartridges 42 within shell 34 as tightly as practicable to maximize the amount of surface area available for filtering exhaust gases. In one embodiment, cartridges 42 may have their respective clamps 48 located at similar positions relative to the lengths of cartridges 42, clamps 48 being spaced from one another by about 1.5 millimeters. It should be appreciated that the number of cartridges surrounding any one cartridge, the proportion of internally located cartridges relative to peripherally located cartridges, and other factors, may vary based on the specific filter shape, packing arrangement, filter size, cartridge diameter, etc.

In one embodiment, each cartridge 42 is arranged such that their first, open ends 45 are supported in support plate 38 and fluidly connected with an interior of inlet portion 30 for receiving raw exhaust gases, and their second end 46 supported in support plate 40. Thus, all of cartridges 42 may be oriented identically. Other embodiments are contemplated, however, wherein cartridges are arranged in filter 25 with their closed ends 46 toward inlet portion 30, or in both possible orientations such that exhaust gases pass into open ends of only a portion of cartridges 42, then into counter-oriented cartridges, and finally out to outlet portion 32 via open ends 45 fluidly connected therewith.

Returning to FIG. 4, perforations 44 will typically be spaced along a length L of cartridge 42, and may define a filtering length F of cartridge 42. In other words, the proportion of length L along which perforations 44 are spaced may be understood as an effective length of cartridge 42 which is available for filtering exhaust gases. In one embodiment, filtering length F may be equal at least to a majority of length L. Cartridge 42 may further include a width W, which may be at least an order of magnitude less than length L.

Cartridge 42 may also include an electrically powered heating element 60, which may be positioned between tube 50 and filter medium 52, such that it contacts filter medium 52 and particulate matter accumulated therein. Positioning heating element 60 in contact with filter medium 52 can allow it to transfer heat to accumulated particulate matter via conduction, convection and radiation. In one embodiment, element 60 may comprise a linear heating element such as an electrically resistive wire or the like, extending in a straight line and having a length equal at least to a majority of filtering length F. Known electrically resistive wires such as a coated nickel-chromium "nichrome" wire might be used in some embodiments, although in other embodiments other known electrically resistive wires might be used. Element 60 might also have a length which is equal to or greater than filtering length F. Cartridge 42 may further include a first electrical connector 191 and a second electrical connector 192, which are configured to connect with one of electrical circuits 98 for supplying electrical power to element 60, as described herein. Each cartridge 42 which is a part of filter 25 may include one heating element such as element 60.

Tube 50 may further include a weld seam 61 which is free of perforations 44, for example a weld seam formed during manufacturing of tube 50. In one embodiment, heating element 60 may extend along weld seam 61, reducing the extent to which exhaust flows directly past or over heating element 60 or at least increasing the path exhaust must follow through filter medium 52 to reach element 60. This arrangement can facilitate ignition of particulate matter in the vicinity thereof for regeneration due to reduced exhaust flow velocity in the region of a soot cake adjacent element 60 where regeneration is to be initiated. Moreover, initiation of combustion, i.e. regeneration, may be relatively easy with the described arrangement, given the relatively long contact length between element 60 and medium 52 in at least some embodiments. Sustaining a controlled flame in an ignited soot cake in filters according to the present disclosure may also be relatively easy, as flame propagation may take place longitudinally, as opposed to axially. Stated another way, propagation of a regeneration flame may take place about a circumference of a filter cartridge, such as a circumference of tube 50. Axial propagation against a flow of exhaust gas may be difficult to sustain, whereas axial propagation with a flow of exhaust gas may be more difficult to control, although systems using axial propagation could still fall within the scope of the present disclosure.

Figure 5:
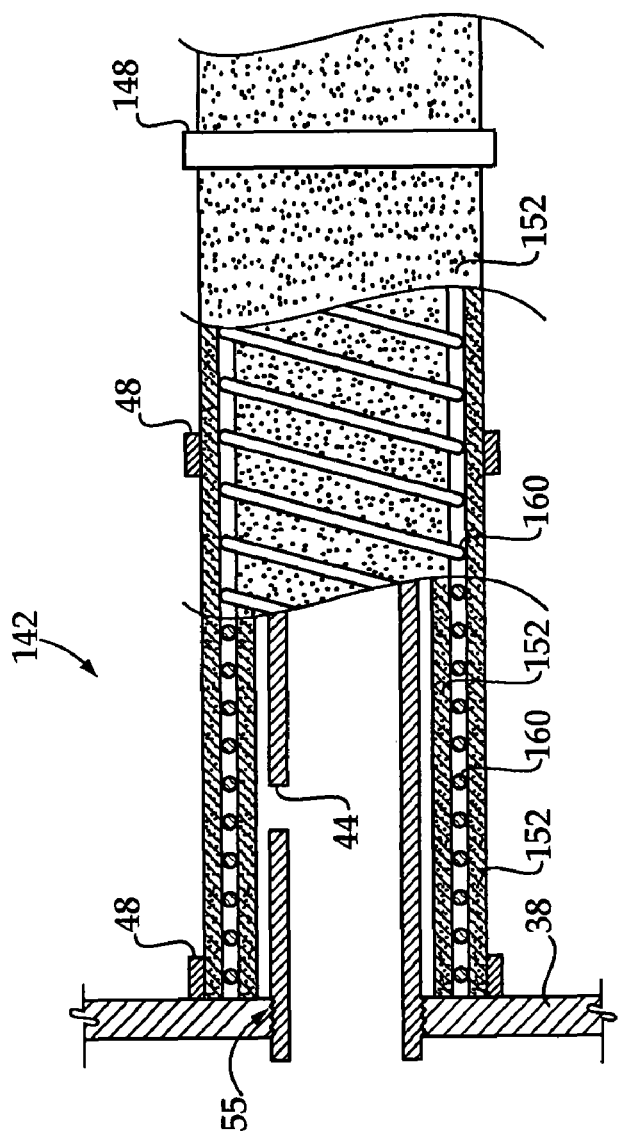
FIG. 5 is a partially sectioned side view, in two section planes, of a portion of a filter cartridge for an exhaust particulate filter, according to one embodiment.

Referring now to FIG. 5, there is shown a filter cartridge 142 wherein features alike to those already described herein are identified with identical reference numerals. Cartridge 142 is similar to cartridge 42, but has several differences, among them the use of a different heating element 160 for initiating regeneration. Rather than a linear heating element positioned generally in a straight line extending along tube 50, cartridge 142 has a heating element which is wrapped within layers of a filter medium 152 and generally spirals about tube 50. Clamps 48 clamp the heating element 160 in position, sandwiched between layers of filter medium 152. Cartridge 142 may be immovably coupled with plate 38 similar to the embodiments described above, and may also be configured to connect with an electrical circuit similar to the arrangement described with regard to cartridge 42 in FIG. 4. Since cartridge 142 may operate similar to that of cartridge 42, the description herein emphasizing cartridge 42 should be understood to also describe cartridge 142 and its operation, except where otherwise indicated.

Still other cartridge embodiments are contemplated within the context of the present disclosure. For example, an electrostatic anode might be used in conjunction with each cartridge to positively charge small particles in the exhaust stream to enhance the ease with which they can be trapped by the corresponding cartridge, and reduce the necessary thickness of filter medium. This strategy would have the added benefits of lighter weight, lower pressure drop across an associated exhaust particulate filter and lower power requirements. In other embodiments, a platinum coated substrate, such as the tube of the filter cartridge, or some other substrate, could be used to enable lowering of the necessary regeneration temperature and also assist in consuming unburned hydrocarbons and reducing carbon monoxide in the exhaust. Lower power requirements and lower pressure drop could also be available in such an embodiment.

Returning to FIGS. 3 and 4, each heating element 60 may further be disposed within a corresponding one of electrical circuits 98, and may be selectively energized via electronic control unit 96, to initiate regeneration of the corresponding cartridge 42. In one embodiment, a predetermined pattern might be followed for regenerating cartridges 42, for example, cycling through cartridges 42 one at a time, so that one of cartridges 42 is always being regenerated during operation of engine system 22. In other instances, groups of cartridges 42 might be regenerated together, for example the group consisting of the outermost cartridges of array 36 might be regenerated together, then groups of cartridges progressively inward of the outermost cartridges might be successively regenerated.

In still other instances, cartridges 42 may accumulate particulate matter non-uniformly, making non-uniform regeneration of cartridges 42 desirable. For example, cartridges nearer a center of array 36, inside of a line Q for example, might accumulate particulate matter more rapidly than those cartridges which are relatively closer to an outer periphery of array 36, outside of line Q. It may therefore be desirable to schedule regeneration of cartridges inside of line Q relatively more frequently. It may also be desirable to regenerate certain of cartridges 42 at a frequency or in a pattern which varies depending upon operating conditions of engine 23. For instance, when engine 23 is operating at a relatively high load, the exhaust mass flow through filter 25 will tend to be relatively high. In some instances, cartridges 42 closer to the center of filter 25 may be filtering a disproportionate amount of exhaust gases passing through filter 25 due to flow behavior of exhaust gases when engine 23 is at higher speeds and/or loads. Due to the relatively high exhaust mass flow, cartridges inside of line Q for example may be relatively more difficult to regenerate during higher load conditions as the exhaust gases may extinguish a flame, if one can even be generated. Thus, cartridges outside of line Q might be successfully regenerated at high load conditions, but cartridges inside of line Q only regenerated at lower load conditions. Signals from sensor 101 may be used to determine whether exhaust mass flow conditions for regenerating certain cartridges are appropriate at any given time. It will thus be appreciated that a variety of factors may bear on the particular timing and frequency of the selected regeneration pattern or strategy.

A further aspect of the present disclosure is a control strategy whereby the accumulation of particulate matter on/in individual cartridges 42 may be monitored or predicted and regeneration selectively scheduled and/or initiated as needed. This approach will enable use of electrical power to initiate regeneration of individual cartridges no more often than necessary, resulting in substantial energy savings over conventional systems which simply regenerate an entire filter regardless of whether individual units within the filter need it or not. To this end, regeneration system 90 may include at least one monitoring element as mentioned above, such as electronic control unit 96, which monitors an electrical resistance property of each one of electrical circuits 98. Monitoring the electrical resistance property may include monitoring an electrical resistance of an electrically conductive element of each of cartridges 42. In one embodiment, the monitored elements may be electrically powered heating elements 60, but in other embodiments the monitored element might be tube 50, filter medium 52, or some other component. Moreover, the term "electrical resistance property" should be understood to include such properties as electrical resistance, change in electrical resistance, rate of change in electrical resistance, etc.

Temperature is proportional to electrical resistance and, hence, electrical resistance of an electrically conductive medium of each of cartridges 42 may increase as the temperature increases. In one embodiment, the relationship between electrical resistance and temperature is used to monitor particulate loading during transients, for example, where engine system 22 increases speed and/or load to accommodate a temporary demand for increased power output. Under such conditions, the exhaust temperature from engine 23 will tend to increase. Since accumulation of particulate matter tends to inhibit exhaust gas flow, those cartridges 42 which heat up relatively faster during certain transients may be receiving a relatively larger percentage of exhaust flow, and hence may be less clogged with particulate matter than cartridges heating up relatively more slowly. Monitoring the electrical resistance property in circuits 98 during transients can thus allow the temperature and, hence, relative amount of accumulated particulate matter in individual cartridges 42 to be determined. The present disclosure further provides a means for determining which of electrically powered heating elements 60 may have failed, as the electrical resistance may be essentially infinite if the corresponding circuit 98 or its components become damaged.

Regardless of the specific strategy used for determining which of cartridges 42 needs to be regenerated, the present disclosure further provides for both feed forward and feedback control over regeneration via system 90. In one embodiment, electrical resistance of circuits 98 can be monitored to identify which of cartridges 42 are loading up with particulate matter relatively more rapidly. If certain cartridges 42 are determined to be loading more rapidly than others, regeneration system 90 can automatically adapt to proactively regenerate those cartridges 42 which are likely to need regeneration soonest. In a related aspect, apportioning of exhaust flow among cartridges 42 may be controlled by selectively regenerating certain cartridges by way of selectively energizing their corresponding elements 60. Thus, while exhaust gas distribution or supply to open ends or inlets 45 of cartridges 42 will not change, the actual filtering of exhaust gases may be varied among cartridges 42 by selective regeneration, as recently regenerated cartridges will be able to filter more of the exhaust gases than those cartridges which are relatively more clogged. Monitoring an electrical resistance property in circuits 98 can also allow regeneration system 90 to confirm that attempted regeneration of selected ones of cartridges 42 has been successful, by monitoring the electrical resistance property subsequent to commanding regeneration. If electrical resistance increases, it may be concluded that the associated soot cake is burning and the regeneration has thus been initiated successfully.

While monitoring an electrical resistance property of electrical circuits 98 during transients is contemplated to be one practical implementation strategy, alternatives are contemplated. Cartridges which are relatively more clogged with particulate matter may have less exhaust gas passing through them than relatively less clogged cartridges. The relatively greater exhaust flow may cool certain of the cartridges more than those with less exhaust flow, resulting in some of the cartridges being at different temperatures than others and, hence, having differences in electrical resistance in their corresponding electrical circuits. Particulate matter also tends to be at least mildly conductive, and therefore its accumulation in or on a particular cartridge may also change the electrical resistance properties thereof. Accordingly, it should be appreciated that various relationships between particulate loading and electrical resistance properties other than those discussed above with regard to transients might be leveraged for use in selective regeneration of filter cartridges without departing from the full and fair scope of the present disclosure.

INDUSTRIAL APPLICABILITY

Figure 6:
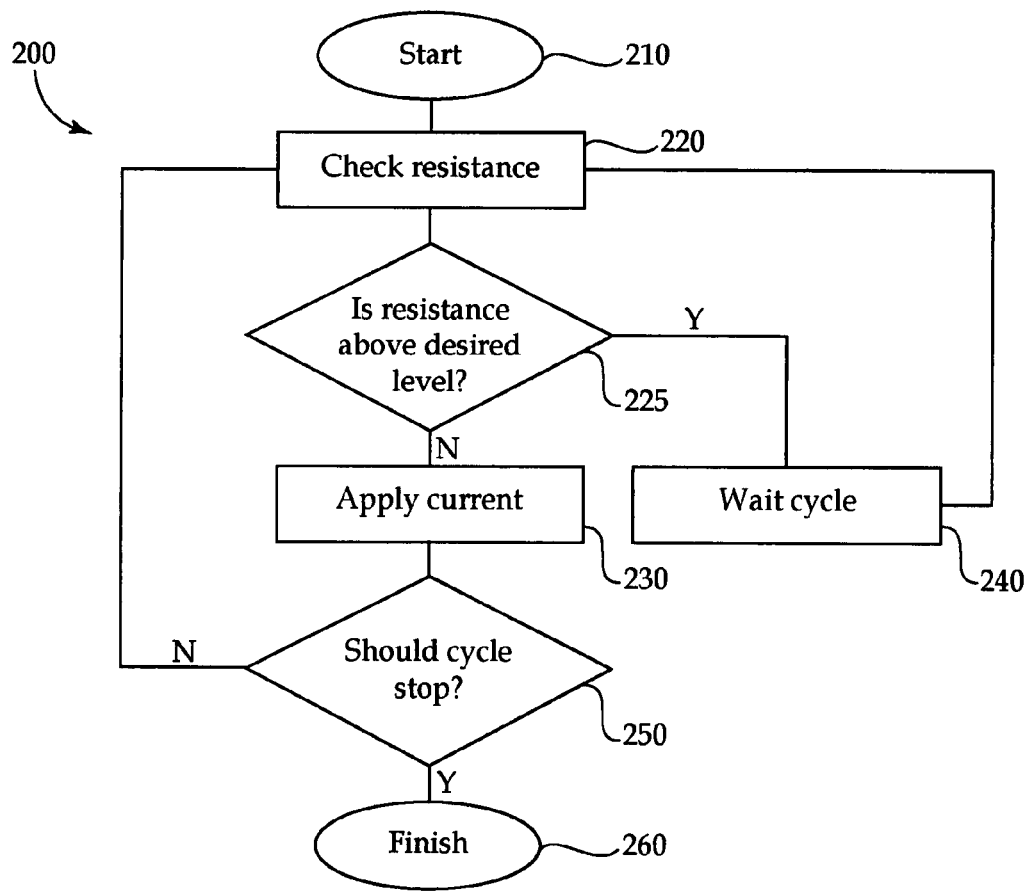
FIG. 6 is a flowchart illustrating a filter regeneration cycle, according to one embodiment.

Referring to FIG. 6, there is shown a flowchart 100 illustrating one example regeneration/control process according to the present disclosure. The process of flowchart 200 may begin at a START or initialize step 210. Initialization of electronic control unit 96, or another control unit of machine 10, may occur upon starting engine 23, for example. From step 210, the process may proceed to step 220 wherein electronic control unit 96 may check the electrical resistance in one of the electrical circuits 98 associated with one of cartridges 42. As discussed herein, an electrical resistance property other than resistance might be monitored with electronic control unit 96, such as change in electrical resistance, rate of change in electrical resistance, etc. Electrical current will typically be supplied to circuits 98 to enable measuring/monitoring the electrical resistance property. Hence, at step 220 one or more of electrical circuits 98 may be energized.

From step 220, the process may proceed to step 225 wherein electronic control unit 96 may determine whether electrical resistance is above a desired level. It will be recalled that during transients exhaust temperature may increase. Since resistance is typically directly proportional to temperature, if resistance is above a desired level at step 225, it may be concluded that a certain level of exhaust flow is passing through the subject cartridge and, hence, it is not clogged to a point at which regeneration is needed. If electrical resistance is not above a desired level at step 225, then the subject cartridge may need to be regenerated and the process may proceed to step 230 at which an electrical current is applied to initiate regeneration. If at step 230 resistance is above a desired level, the process may proceed to step 240 to implement a wait cycle for that particular cartridge, then loop back to step 225 to check resistance again. If the process proceeds via step 230, after applying current it may proceed to step 250 to query whether the cycle should stop, for example if engine 23 has been shut down, conditions are not otherwise appropriate for regeneration, or whether the process should proceed to check another cartridge. If yes, the process may proceed to step 260 to FINISH. If no, the process may return to step 220 to monitor the same or another one of cartridges 42.

All of the filter embodiments contemplated herein may include an array of filter cartridges 42 having a shape which can be at least partially matched to a shape of parts of a filter/filter housing wherein the respective array of cartridges is to be positioned. Rather than being restricted solely to cylindrical shapes as in many earlier filter design strategies, the present disclosure provides for vastly greater flexibility in filter shape design. This aspect is considered to greatly improve the ease with which exhaust particulate filters may be fitted within spatially restrictive or spatially complex spaces within or on machines. Further, the use of robust materials having similar or identical coefficients of thermal expansion can result in a filter capable of withstanding shocks and vibrations associated with rugged off-highway environments, as well as thermal cycling and relatively extreme temperatures. Moreover, no moving parts or delicate temperature controls are necessary, as cartridges 42 may be regenerated while exhaust gases are passing therethrough according to the single exhaust flow distribution pattern of filter 25.

As mentioned above, the presently described regeneration strategy also offers advantages with regard to power consumption and the ease with which a particular system can be retrofitted. The relatively low power consumption that initiates regeneration of one or a small number of cartridges 42 will permit regeneration during idling and refueling. And it will also be unnecessary to equip retrofitted machines, or new machines for that matter, with overly large and expensive alternators for powering regeneration system 90. The present strategy will also allow failures to be predicted before they actually occur. By monitoring a base resistance in electrical circuits 98 over time, preventative maintenance of filter 25 may be undertaken, replacing cartridges 42 which are predicted to fail due to damage to their heating element 60. Exhaust temperature feedback is also made possible by monitoring an electrical resistance in circuits 98.

Noise concerns may also be lessened, as combustion noise from regenerating a smaller proportion of the total number of filter cartridges may be relatively low. Expense is also reduced, as noble metal catalysts and relatively complex dosing systems may be reduced or eliminated altogether. By relying at least primarily on electrical regeneration, the present strategy is also not susceptible to variations due to fuel composition such as sulfur content, as is the case with certain other designs. Where catalysts are used, electronic control unit 96 may also be able to determine the amount of supplemental heat which needs to be added for fast CO and unburned hydrocarbon light-off.

Further still, filters according to the present disclosure may have a relatively longer working life, as the thermal cycling resulting from regeneration of only a few of cartridges 42 at a time will typically be much less than that of other filters wherein all or a relatively larger proportion of filter cartridges are regenerated together. Finally, concerns relating to cracking, melting and other heat-related damage may be reduced in filters designed and operated as described herein compared with other known systems. Many earlier filter systems were designed with relatively complex diffusers and the like in an attempt to ensure that the filter would load up with particulate matter relatively uniformly. Non-uniform loading tended to be of significant concern, as regeneration of relatively heavily loaded portions of a filter could result in relatively extreme temperature gradients across the filter, leading to heat-related damage.

The present disclosure reduces these concerns, as not only can relatively minute portions of the filter, e.g. one cartridge at a time, be selectively regenerated, but portions of the filter which are loading up relatively more rapidly than others can be proactively regenerated prior to a point at which the volume of particulate matter becomes a concern. The feed forward evaluation of the loading state of cartridges 42 also enables regeneration system 90 to adapt and react to loading of cartridges 42, proactively regenerating certain cartridges at a certain time or under certain conditions so that other cartridges can be regenerated at other times or under other conditions. For example, as discussed above, it may not be desirable to regenerate cartridges within a main flow path during high loads. Thus, during high loads, cartridges which are not within the main flow path may be regenerated to make them available for filtering exhaust gases during lower loads, during which those in the main flow path may be regenerated.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. Other aspects, features and advantages will be apparent upon an examination of the attached drawings and appended claims.

What is claimed is:

1. An exhaust particulate filter system comprising:
a shell including an exhaust gas inlet and an exhaust gas outlet;
an array of filter cartridges positioned within said shell and configured to filter exhaust gases passing between said exhaust gas inlet and said exhaust gas outlet, each of said filter cartridges including a tube having perforations therein, a fibrous metallic filter medium and at least one inlet fluidly connected with said exhaust gas inlet;
a distribution element for exhaust gases disposed within said shell between said exhaust gas inlet and said exhaust gas outlet, said distribution element having a fixed configuration and being adapted to direct exhaust gases toward inlets of each of the filter cartridges of said array, said exhaust particulate filter defining a single exhaust gas distribution pattern which includes a fixed distribution of exhaust gases from said exhaust gas inlet to the inlets of each of said cartridges; and
a filter regeneration system configured to selectively regenerate less than all of said filter cartridges at a time, said filter regeneration system being configured to connect with an electrical power source and including electrically powered heating elements coupled one with each of said filter cartridges;
said exhaust particulate filter system having a first filter state in which a first subset of said heating elements is in a regeneration initiating electrical energy state, a second subset of said heating elements is in a second electrical energy state, and said exhaust gas inlet is fluidly connected with said exhaust gas outlet by way of said fixed distribution of exhaust gases; and
said exhaust particular filter system having a second filter state in which the second subset is in the regeneration initiating electrical energy state and the first subset is in the second electrical energy state, and said exhaust gas inlet is fluidly connected with said exhaust gas outlet by way of said fixed distribution of exhaust gases.

2. The system of claim 1 wherein said filter regeneration system further comprises a plurality of parallel electrical circuits each having one of said electrically powered heating elements disposed therein and a control device configured to selectively energize each one of said electrical circuits via said electrical power source.

3. The system of claim 2 wherein each of said electrically powered heating elements comprises an electrically resistive heating element which is separate from the tube of the corresponding filter cartridge, and wherein said electrical power source comprises at least one of a battery, a generator and an alternator.

4. The system of claim 2 further comprising a monitoring device coupled with each of said electrical circuits and configured to output signals corresponding to an electrical resistance property of each of said electrical circuits.

5. The system of claim 4 comprising an electronic control unit that includes said control device and said monitoring device, said electronic control unit being configured to selectively initiate regeneration of said filter cartridges at least in part by energizing the corresponding electrical circuit in a manner which is responsive to said signals.

6. The system of claim 2 wherein a number of said filter cartridges is about fifty or greater.

7. The system of claim 2 wherein a number of said filter cartridges is about one hundred or greater.

8. The system of claim 6 wherein said shell has an inner perimeter, and wherein said array of filter cartridges defines a perimetric line which is spaced from said inner perimeter an average distance which is less than a width of one of said filter cartridges.

9. The system of claim 6 wherein a plurality of perforations in each of said tubes define a filtering length thereof, wherein each of said electrically powered heating elements comprises a linear electrically resistive heating element having a length equal to at least a majority of the filtering length of the corresponding tube, and wherein each of said electrically powered heating elements contacts the fibrous metallic filter medium of the corresponding filter cartridge.

10. The system of claim 2 wherein each of said tubes includes a weld seam free from said perforations, and wherein each of said electrically powered heating elements comprises a linear electrically resistive heating element extending along and adjacent to the weld seam of the corresponding cartridge.

11. A method of operating an exhaust particulate filter system of an internal combustion engine comprising the steps of:
filtering particulates from exhaust gases with an array of filter cartridges of an exhaust particulate filter, including passing the exhaust gases from an inlet of the exhaust particulate filter to inlets of the filter cartridges via an exhaust gas distribution pattern which includes a fixed distribution of exhaust gases from the filter inlet to the cartridge inlets;
initiating regeneration of a first subset of the filter cartridges at a first time at least in part by energizing a first subset of a plurality of electrically powered heating elements coupled one with each of the filter cartridges of the first subset; and
without changing the exhaust gas distribution pattern between the first time and a second time, initiating regeneration of a second subset of the filter cartridges at the second time at least in part by energizing a second subset of the plurality of electrically powered heating elements coupled one with each of the filter cartridges of the second subset.

12. The method of claim 11 further comprising the steps of sensing an electrical resistance property of an electrically conductive medium of at least one of the filter cartridges, and generating a signal corresponding to the sensed property.

13. The method of claim 12 wherein the sensing step includes sensing an electrical resistance property of the electrically resistive powered heating elements, and wherein the step of initiating regeneration of at least one of the filter cartridges includes initiating regeneration in a manner which is responsive to the signal, the method further comprising a step of propagating a regeneration flame around a circumference of the at least one of the filter cartridges.

14. The method of claim 12 further comprising a step of scheduling regeneration of at least a portion of the filter cartridges based at least in part on the sensed electrical resistance property.

15. The method of claim 14 wherein the scheduling step further comprises scheduling regeneration of a first subset of the filter cartridges more frequently than regeneration of a second subset of the filter cartridges.

16. The method of claim 11 further comprising a step of controlling apportioning exhaust flow among the filter cartridges by way of the energizing step.

17. The method of claim 11 further comprising the steps of:
outputting a signal corresponding to an exhaust mass flow from an engine coupled with the exhaust particulate filter; and
selectively initiating regeneration of at least one of the filter cartridges via the energizing step in a manner responsive to the signal.

* * * * *